United States Patent [19]
Woodward et al.

[11] Patent Number: 5,735,922
[45] Date of Patent: Apr. 7, 1998

[54] METHOD OF BENDING AND TEMPERING GLASS SHEETS

[75] Inventors: Alan Charles Woodward, Winstanley, United Kingdom; Hans-Dieter Funk, Witten, Germany; Richard A. Herrington, Walbridge, Ohio; Kazunori Yuki, Doshomachi, Japan

[73] Assignees: Pilkington Glass Limited, Merseyside, United Kingdom; Flachglas Aktiengesellschaft, Furth, Germany; Libbey-Owens-Ford Company, Toledo, Ohio; Nippon Sheet Glass Co., Limited, Osaka, Japan

[21] Appl. No.: 808,683

[22] Filed: Feb. 28, 1997

Related U.S. Application Data

[63] Continuation of Ser. No. 420,653, Apr. 12, 1995, abandoned.

[30] Foreign Application Priority Data

Apr. 15, 1994 [GB] United Kingdom ............ 9407610

[51] Int. Cl.⁶ ............................................. C03B 23/035
[52] U.S. Cl. ............................................. 65/104; 65/106
[58] Field of Search ................................. 65/104, 106, 107, 65/114, 115

[56] References Cited

U.S. PATENT DOCUMENTS

| | | | |
|---|---|---|---|
| 3,421,875 | 1/1969 | Kirkman | 65/273 |
| 3,778,244 | 12/1973 | Nedelec et al. | 65/106 |
| 3,846,104 | 11/1974 | Seymour | 65/104 |
| 4,229,199 | 10/1980 | Seymour | 65/106 |
| 4,280,828 | 7/1981 | Seymour | 65/106 |
| 4,285,715 | 8/1981 | Frank | 65/106 |
| 4,339,259 | 7/1982 | Paudice et al. | 65/104 |
| 4,872,898 | 10/1989 | Enk et al. | 65/287 |
| 4,883,526 | 11/1989 | Enk et al. | 65/104 |
| 4,895,244 | 1/1990 | Flaugher et al. | 198/384 |
| 4,952,227 | 8/1990 | Herrington et al. | 65/162 |
| 4,983,202 | 1/1991 | Deb et al. | 65/104 |
| 5,004,492 | 4/1991 | Borer et al. | 65/289 |
| 5,178,660 | 1/1993 | Wampler et al. | 65/273 |
| 5,279,635 | 1/1994 | Flaugher et al. | 65/103 |
| 5,286,271 | 2/1994 | Rueter et al. | 65/106 |
| 5,441,551 | 8/1995 | Ollfisch et al. | 65/162 |

FOREIGN PATENT DOCUMENTS

| | | |
|---|---|---|
| 0397502 | 11/1990 | European Pat. Off. |
| 0451469 | 10/1991 | European Pat. Off. |
| 0531153 | 3/1993 | European Pat. Off. |
| 0555079 | 8/1993 | European Pat. Off. |
| 2693184 | 1/1941 | France |
| 4209219 | 3/1920 | Germany |
| WO90/15781 | 12/1990 | WIPO |

*Primary Examiner*—Donald E. Czaja
*Assistant Examiner*—Sean Vincent
*Attorney, Agent, or Firm*—Burns, Doane, Swecker & Mathis, L.L.P.

[57] ABSTRACT

Glass sheets are press bent and tempered, especially for use as glazings in vehicles. Such glazings are required to be accurately bent to a complex shape while meeting high standards of optical quality and fracture safety at an acceptable cost. A method of bending and tempering a glass sheet is provided comprising heating the sheet in a furnace, including heating at least one portion of the sheet to a higher temperature than another portion, conveying the sheet out of the furnace and into a press bending station, shaping the sheet by pressing it between opposed complementary upper and lower press members, at least one of the members being internally heated, transferring the bent glass sheet onto a shuttle carrier ring conforming to the periphery of the sheet, and tempering the sheet while supported on the carrier ring. A corresponding apparatus is also described.

14 Claims, 13 Drawing Sheets

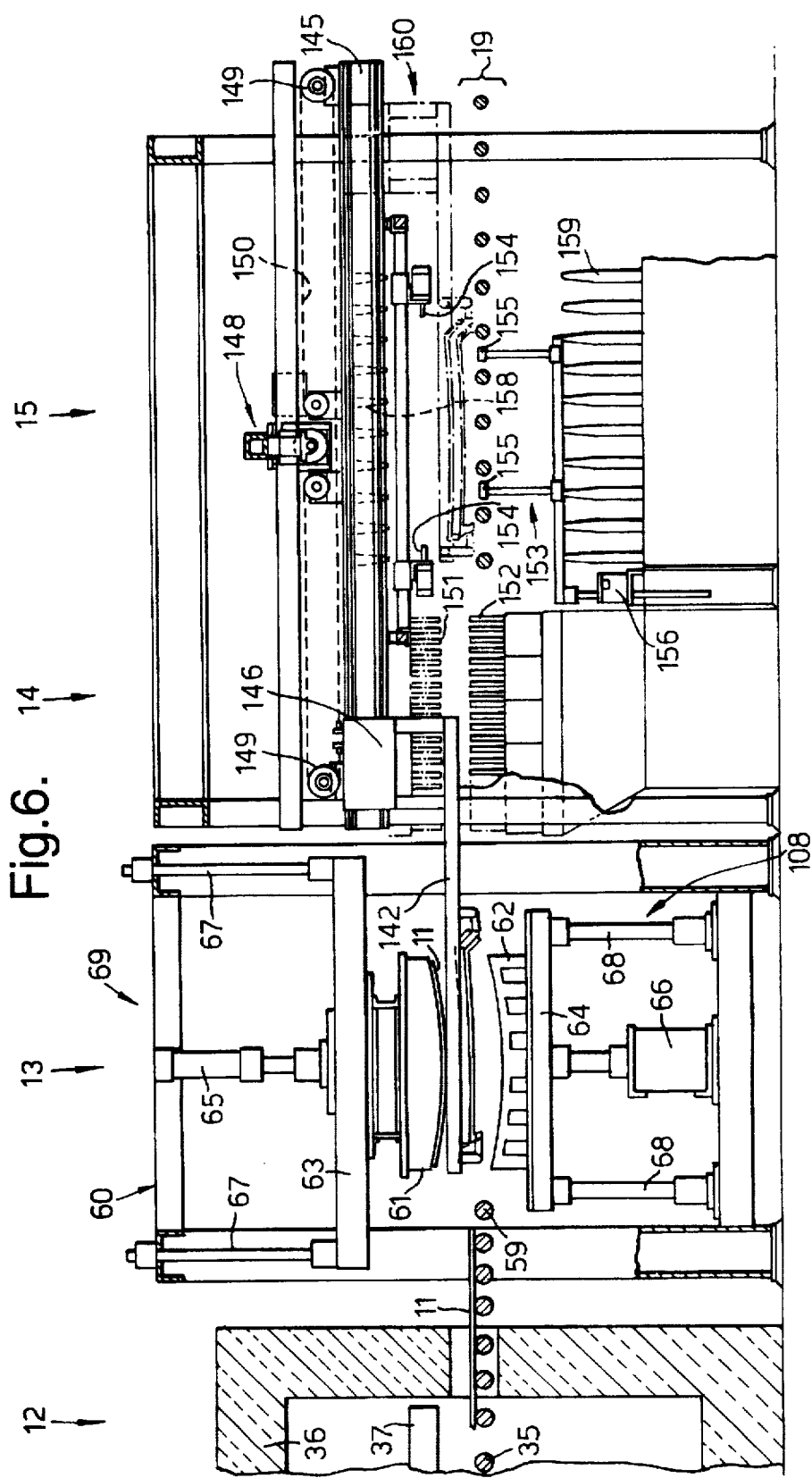

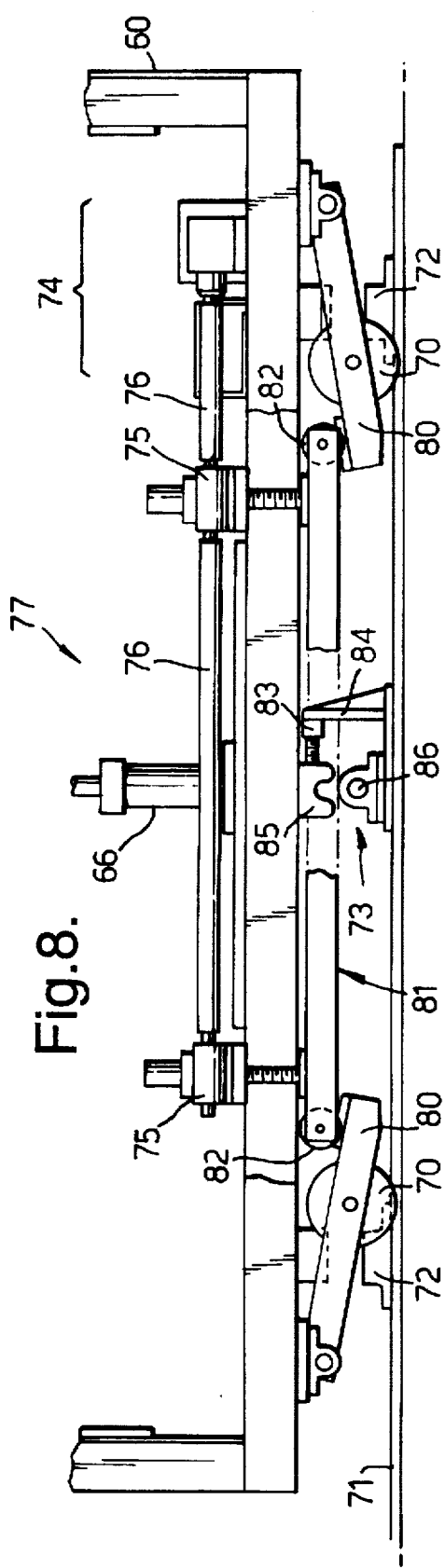
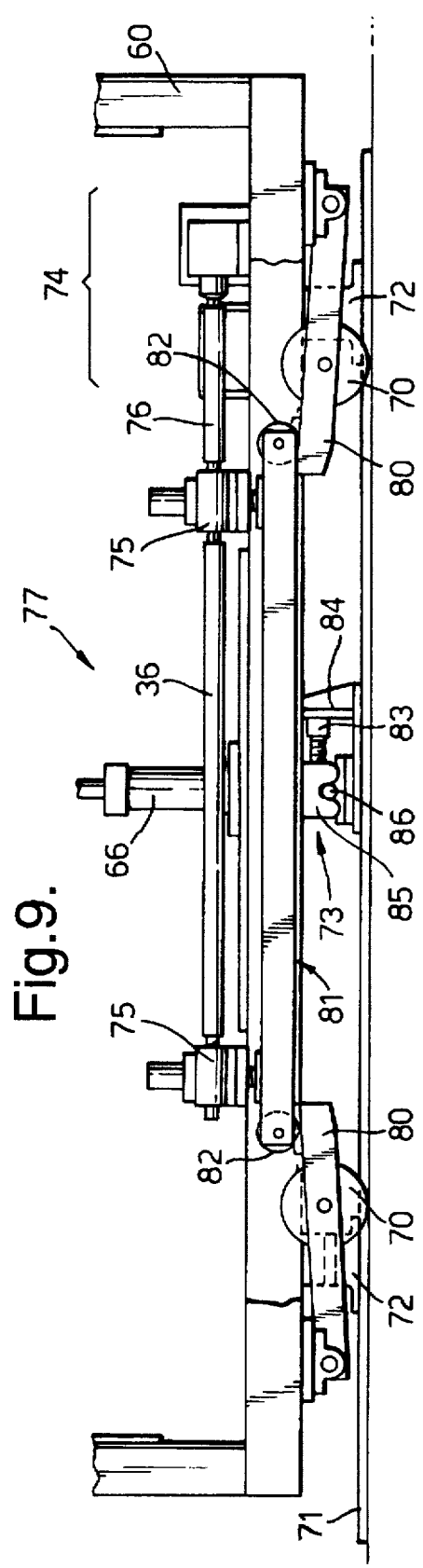
Fig.8.
Fig.9.

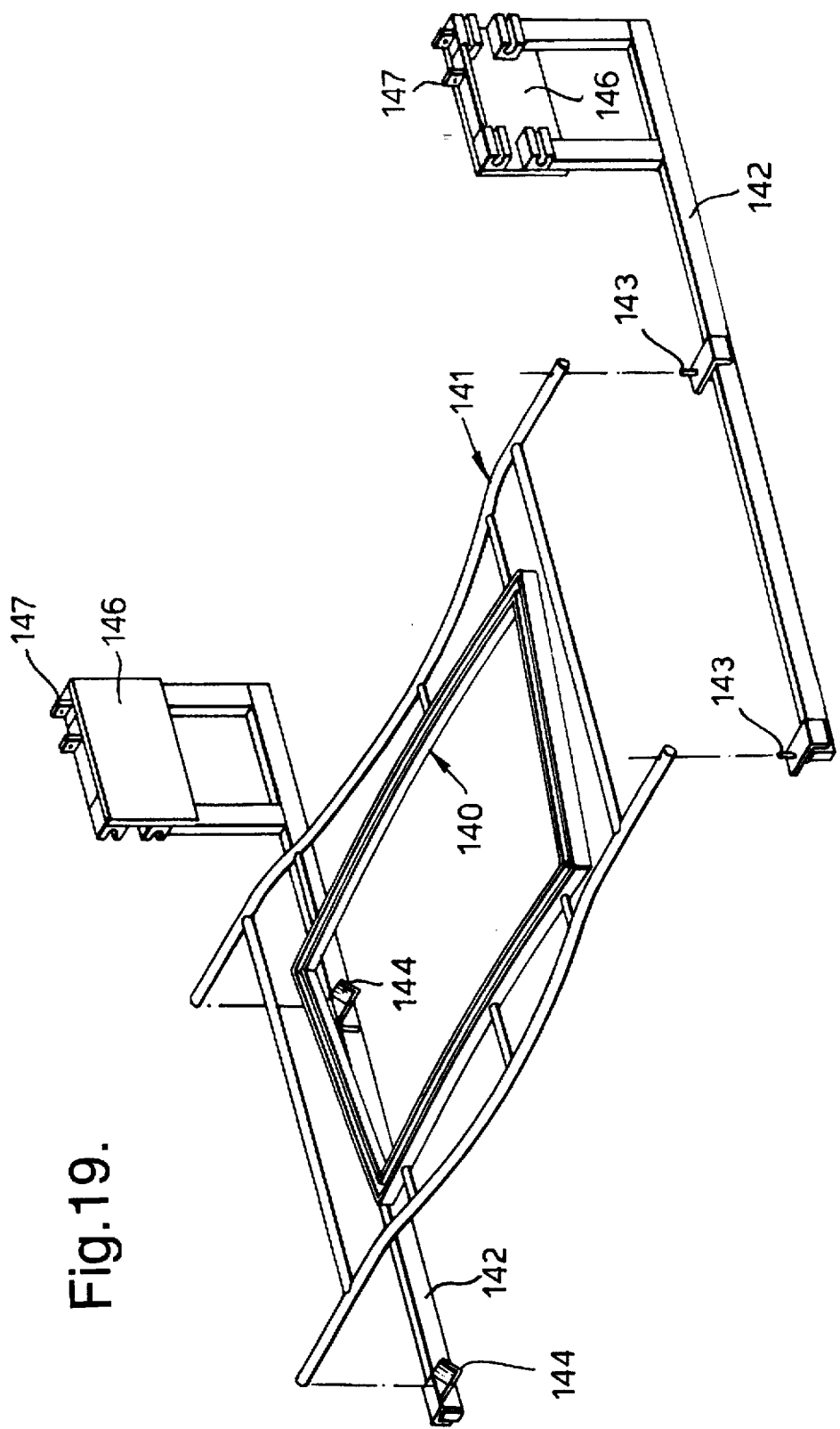

METHOD OF BENDING AND TEMPERING GLASS SHEETS

This application is a continuation, of Application Ser. No. 08/420,653, filed Apr. 12, 1995, now abandoned.

BACKGROUND OF THE INVENTION

1. Field of the Invention

The present invention relates to the bending of glass sheets, and more particularly, to an improved method and apparatus for press bending and tempering glass sheets for glazing vehicles. By "press bending", a shaping process is meant in which a heat-softened glass sheet is pressed between complementary opposed shaping surfaces which are provided on press members such as moulds.

2. Description of the Related Art

When producing tempered curved panes of glass for the windows of vehicles such as cars, a number of requirements need to be met simultaneously. First, a pane must satisfy relevant safety requirements, such as ECE R43 in Europe, which lays down approved fracture patterns intended to reduce injuries incurred in the event of breakage of the glass. The pane should also be of the correct size and shape for the opening in the vehicle which it is intended to fit. It should further be free from surface defects and of sufficient optical quality to permit a distortion-free view through the window. Additionally, the cost of the pane has to be acceptable to the customer, the vehicle manufacturer.

In recent years, these demands on the glass producer have become much more exacting. Modern vehicle styling trends call for glass of complex shape, i.e. having curvature in two directions at right angles to each other, and for precise control of the curvature across the whole pane of glass, not just the periphery which fits onto a glazing flange of the vehicle bodywork. Often the curvature in the wrap direction (side-to-side) is deep and/or sharp in nature. In addition to achieving these difficult shapes, the tolerances required have become increasingly exacting as a result of a general continuing increase in the quality of vehicle assembly sought by the manufacturer, and more specifically, because automotive glass may be edge encapsulated with a gasket, or installed by robot, and these techniques impose very tight tolerances on the glass.

It is in any case more difficult to avoid optical distortion in complex shapes, and furthermore, since vehicle glazing must meet the increasingly stringent optical standards now being demanded, the glass producer needs to pay close attention to this in his bending processes.

Moreover, the drive for weight reduction in vehicles to reduce fuel consumption has prompted the use of thinner glass; e.g. 3 mm thick glass is now frequently used for toughened panes instead of 4 mm and 5 mm thickness. It is more difficult to temper thinner glass adequately, and it is more susceptible to loss of shape and optical distortion while in a heat-softened condition, so the difficulties faced by the glass producer are compounded.

While many of the difficulties may be alleviated by bending glass sheets relatively slowly in a press bending system in which the press is located in a heated environment, such a process tends to have long cycle times and to be expensive to operate. Considerations of cost urge the glass producer to develop processes capable of shorter cycle times, shorter mould changeover times, and higher yields, while still producing glass of the required shape and quality. Although shorter cycle times, changeover times and higher yields have been achieved in the past, the glass produced did not have to meet modern shape and quality standards, nor was it as thin as it now required.

For example, there is a known press bending system in which glass sheets are conveyed on rollers throughout the process, from heating to quenching, and the pressing step occurs outside the furnace. In such a system it is possible to produce a continuous rapid succession of glass sheets, providing each step in the process occurs quickly enough. While such a system served admirably for glass of 4 mm thickness and above, it has proved difficult in a production environment to produce thinner glass on it to the standards required when bending to shapes with a significant degree of complexity. Optical distortion may occur during pressing, and furthermore, heat-softened sheets are susceptible to both distortion and loss of shape from a variety of causes while supported on rollers. Attempts to improve optical quality by bending at a lower temperature result in an unsatisfactory fracture pattern in the glass on breakage and/or low yield.

The problem of loss of shape in a bent glass sheet is addressed by WO90/11973, which corresponds to U.S. Pat. No. 4,883,526. This proposes a shuttle arrangement for transferring the bent sheet from a bending station to a discharge or quench station. The bent sheet is placed upon a shuttle ring, conforming in outline and elevation to the marginal edges of said sheet, by the downward vertical movement of a lower shaping ring mould (carrying the sheet) relative to the shuttle ring. The shuttle ring is therefore arranged to the concentric with, and inboard of, the ring mould at this moment in the process. However, this arrangement can be improved upon because, being inboard of the periphery of the bent glass sheet, the shuttle ring can in practice leave marks in a vision area of the sheet. WO93/14038 corresponding to U.S. Pat. No. 5,279,635 concerns the problem of distortion in press-bent glass sheets, and is particularly concerned with modifying the press bending moulds to alleviate distortion. It teaches that these problems have in part been caused by overheating sheets in a furnace to compensate for heat loss subsequent to exiting the furnace. By providing heated shaping moulds, this subsequent heat loss can be reduced, and the need for such intensive heating in the furnace avoided. The disclosure does not solve the problems of loss of shape of a bent glass sheet. These problems tend to be especially severe when bending thin glass sheets for tempering, because of the need for a glass sheet to be at a relatively high temperature when it is conveyed into the quench station for it to be adequately tempered. The majority of glass panes presently fitted to European vehicles have a degree of complex curvature, and a need therefore exists for a bending and tempering process capable of producing glass panes of the required moderately complex shape, possibly including deep or sharp bends, while satisfying the present stringent standards for optical quality and fracture pattern, at a cost acceptable to the vehicle manufacturer.

SUMMARY OF THE INVENTION

According to the present invention there is provided a method of bending and tempering a glass sheet comprising:

heating the sheet to a heat-softened condition in a furnace, including heating at least one portion of the sheet to a higher temperature than another portion, conveying the sheet out of the furnace and into a press bending station, shaping the sheet by pressing it between opposed complementary shaping surfaces provided on upper and lower press members, at least one of the members being internally heated, transferring the bent glass sheet onto a shuttle carrier ring conforming to the periphery of the sheet, tempering the bent glass sheet, while supported on the carrier ring, by quenching the surfaces of the sheet, removing the bent and tempered glass sheet from the carrier ring.

The technique of heating at least one portion of the sheet to a higher temperature than another portion is commonly referred to as "differential heating". Those parts of the sheet which are to be bent more deeply and/or more sharply (i.e. to a smaller radius of curvature) are heated to a higher temperature to allow them to deform more readily, i.e. reasonably quickly yet without introducing distortion. This feature of the method is therefore functionally related to the pressing step in which the shape, with its deep or sharp bends, is imparted to the glass.

It is advantageous to perform the press bending step outside the furnace because this greatly simplifies the mechanical engineering involved, thereby reducing the cost of the apparatus. It also enables the press bending mechanism to be designed to work on a shorter cycle time, and reduces the temperature cycling that occurs as e.g. a door of the furnace opens to allow each bent sheet and its support to exit. However, to bend glass sheets reasonably quickly and without introducing distortion, and to obtain an adequate degree of temper in the sheet, we have found that it is necessary to heat at least one of the press members. The provision of "heated tooling", as this feature may be referred to, is therefore functionally interlinked with the location of the press bending station outside the furnace when the glass is to be tempered after pressing.

It has been found that further improved optical quality can be obtained when the glass sheet has undergone a preliminary shaping step before being press bent, so that a lesser degree of change of shape remains to be achieved at the press bending step. Preferably, therefore, the method includes pre-shaping the heat-softened glass sheet, for example by conveying it on a support shaped to provide the required pre-bend, for example contoured rollers, or mutually inclined straight rollers, the length of the rollers and angles of inclination being selected according to the pre-bend it is desired to impart to the sheet.

Normally, the complementary shaping surfaces take the form of an upper male full face mould and a lower female outline ring mould. Preferably, at least part of the shaping surface of the male mould is porous or provided with larger apertures, normally opening into passages, at which the air pressure may be reduced, e.g. by connection to a plenum chamber maintained at reduced pressure, so as to cause a force sucking the glass sheet onto the shaping surface. Such a mould is termed a vacuum male mould. Advantageously, the shaping of the glass sheet may be assisted by the pressure difference, resulting from the use of a vacuum mould, between the two faces of the glass sheet as it is pressed between the moulds. This assistance is especially useful when the shape desired in the bent glass sheet includes an area of reverse curvature, i.e. a concave area in a generally convex sheet.

A further advantage of a vacuum male mould is that it may be used to suspend the bent glass sheet after shaping, allowing the female ring mould to be lowered away from the male, and the glass to be positioned over a shuttle carrier ring, by relative movement between the ring and the male mould, for deposition of the glass onto the carrier ring. Preferably, the bent sheet is suspended from the male mould while the shuttle carrier ring moves in below the male mould to receive the bent glass sheet. Alternatively, the male mould may itself move substantially horizontally, while carrying the bent glass sheet, until it is positioned above the carrier ring. Either way, the incidence of surface marking of the glass sheet is reduced. Marking and accuracy of shape may be further improved by lowering the vacuum male in a controlled fashion when transferring the glass to the carrier ring, and only releasing the sheet when it is close to the ring, so that the sheet is gently placed, rather than dropped, on the ring. This reduces the impact suffered by the sheet, and increases the accuracy of location of the sheet on the ring. Since the ring may be designed to conform to the outline shape of the bent sheet, this shape may thereby be better maintained.

For accurate and reproducible bending of glass sheets, it is important that each glass sheet is accurately located between the moulds. Where different portions of the sheet are heated to different temperatures in the furnace, or where a preliminary shaping step is employed, it is also important that the sheet is accurately located at the relevant point. Preferably, therefore, means are provided to align the glass sheet before it enters the furnace, and more preferably, means are provided to detect and correct deviation of a sheet from a desired alignment at one or more subsequent stages in the process.

The method of bending and tempering a glass sheet provided by the invention has been designed to be suitable for thin glass sheets, especially sheets of 3 and 4 mm nominal thickness (actual thickness range 2.8–4.2 ram), and more especially for thin sheets having a moderate degree of complex curvature. In the context of bending glass for vehicles, the skilled person understands "thin" glass to be glass up to 4.2 mm thick. While the invention may also be used for bending and tempering glass sheets having a thickness outside the above range, it will normally be possible to process thicker sheets satisfactorily on prior art apparatus. At present there is little commercial requirement for bending and tempering glass sheets thinner than 2.8 mm.

The present invention also provides an apparatus for bending and tempering a glass sheet comprising:

a furnace for heating the sheet to a heat-softened condition, including means of heating at least one portion of the sheet, to a higher temperature than another portion, a press bending station comprising opposed complementary shaping surfaces provided on upper and lower press members mounted for opposed reciprocating movement relative to each other, at least one of which is internally heated, conveyor means for conveying the glass sheet through the furnace and out into the press bending station, a quench station comprising opposed blastheads for directing flows of cooling fluid so as to impinge on the surfaces of the bent sheet and quench them, thereby tempering the sheet, shuttle means for receiving the sheet from the press bending station comprising a carrier ring conforming to the periphery of the bent glass sheet, the ring being displaceable in a substantially horizontal direction through the quench station, an unloading station comprising means for removing the bent and tempered sheet from the carrier ring.

The advantages of combining differential heating, a press bending station located outside the furnace, and the provision of heated tooling have already been mentioned. Having made such provision to bend a glass sheet to a carefully controlled shape, it is of course important that that shape is maintained until the sheet is cooled by quenching, and becomes rigid. A shuttle carrier ring conforming in outline and elevation to the periphery of the bent glass sheet has been found to be the best way of transferring the sheet from the press bending station through the quench station to the unloading station. This feature therefore co-operates with the features of the earlier part of the apparatus, the function of which was described above, in providing a bent and tempered glass sheet meeting the stringent requirements of optical quality, complex shape within tight tolerances and a fracture pattern meeting ECE R43, all at an acceptable cost.

One way of providing differential heating is to arrange the furnace as a number of uniform heating sections followed by one or more differential heating sections (a differential heating section being one that is capable of heating one portion of the sheet to a higher temperature than another portion). Preferably, a uniform heating section comprises an elliptical roof with heating elements disposed on the inside thereof. Preferably the roof may be retractable to allow maintenance. The differential heating section preferably comprises such a uniform heating section with additional heaters disposed below the elliptical roof, preferably in a substantially horizontal array. The heaters may be controlled so that a portion of the sheet which is to be bent to a smaller radius of curvature is heated to a higher temperature than another portion.

Preferably, the apparatus includes means of imparting a preliminary bend to the heat-softened glass sheet before it is press bent.

Generally, the complementary shaping surfaces employed are specific to the shape of a particular glass pane. It is therefore necessary to exchange one or generally both of the moulds installed in the press bending station when it is desired to produce a different glass pane, and often some adjustment is required before satisfactory production of the new pane is achieved. However, this changeover results in a period of time for which the plant is out of production ("downtime"), and as mentioned above, it is desirable to reduce such changeover times to reduce costs. Preferably, time is saved by providing the press with wheels and a centering/levelling system so that it can be removed from its operating position in the production line, the moulds exchanged or adjusted, and the press replaced, and aligned with the line with minimal delay.

At least one mould is provided with internal heating means, i.e. means to release heat within the mould so that heat is supplied to the shaping surface from a direction within the mould. It will be appreciated that as the press bending station is outside the furnace, the mould would otherwise be cold at the start of a production run, resulting in unsatisfactory bending of a substantial number of sheets until it reached operating temperature. Both moulds may be heated, but as the lower mould is normally of outline or ring construction resulting in a relatively low heat capacity, it warms up relatively quickly and so it is sufficient to heat only the upper mould.

By internal heating, the skilled person understands that energy (whether in the form of heat or not) is supplied into the mould, and released as heat within the mould. The shaping surface is therefore primarily heated from within the mould, rather than directly heated solely by means external to the mould, e.g. external radiant heaters or burners, or heated by hot glass sheets coming into contact with the mould. There are several different means of internal heating; one such means comprises electric heating elements situated in part or all of the mould, e.g. located in spaced bores; such elements may be controlled by suitable temperature control circuits. Another internal heating means comprises conduits extending through the mould, through which a hot fluid may be passed. The conduits may be connected to an external source of heated fluid, and the fluid may be liquid, e.g. an oil, or gaseous, e.g. air.

Preferably the shaping surfaces are maintained at a temperature between 200° C. and 350° C., preferably 220° C. to 300° C., most preferably around 250° C., while producing glass panes of satisfactory optical quality and fracture pattern. It is surprising that adequately tempered thin glass can be produced on an apparatus in which the transfer time from furnace exit to quench station may be as long as 5 to 8 seconds, and the shaping surfaces are at such a low temperature.

Preferably the shuttle means comprises a frame in which the carrier ring is supported. The frame travels on glide rails which may extend from the press station to the unloading station or for only part of this distance. The glass sheet may be removed from the carrier ring by one of several methods, for example, the sheet may be lifted from the ring by a lift mechanism and then supported at its periphery by pins while the ring withdraws. Alternatively, a vacuum holder may be used to lift the sheet from the carrier ring.

The invention also includes a glass sheet bent and tempered by a method or on an apparatus in accordance with the invention herein described.

BRIEF DESCRIPTION OF THE DRAWINGS

Preferred embodiments of the invention will now be described by way of non-limiting examples with reference to the accompanying drawings in which:

FIG. 6 is a side view, partly in section, of part of the press bending and tempering apparatus of FIG. 1, including the exit from the furnace, a press bending station, a quench station and an unloading station.

FIG. 8 is an end view, in a direction at right angles to that of FIG. 7, of the lower part of the press shown in FIG. 7, showing it in a raised position, FIG. 9 is an end view, viewed in the same direction as FIG. 8, showing the same part of the press in a position in which it is lowered for press bending operation, FIG. 19 is a perspective view of part of a shuttle means included in the apparatus of FIG. 6.

DETAILED DESCRIPTION OF THE PREFERRED EMBODIMENTS

Figure 1:
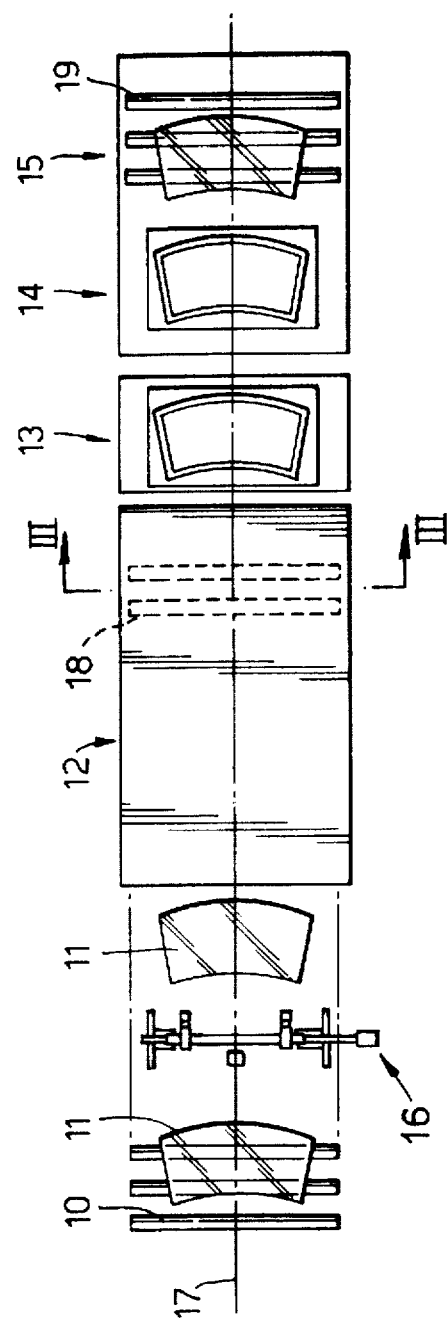
FIG. 1 is a highly schematic overall plan view of a press bending and tempering apparatus.

Referring to FIG. 1, the drawing shows a press bending and tempering apparatus for bending and tempering a glass sheet in a generally horizontal orientation comprising a first or supply conveyor 10 which delivers glass sheets 11 to the entrance of a furnace 12. The furnace 12 includes a second conveyor means 18 which transports the sheets 11 through the furnace and delivers them to a press bending station 13 where the heat-softened glass sheets are pressed between complementary opposed shaping surfaces provided on press members in the form of moulds. The press bending station is equipped with a third conveyor means (not shown). The bent sheets are then transported through a quench station 14 where they are tempered, and into an unloading station 15, where the bent and tempered sheets are transferred onto a fourth conveyor 19. Transport between the press bending station 13 and the unloading station 15 is by means of a shuttle, shown in FIGS. 6 and 19. The apparatus has a centre line 17.

In FIG. 1, glass sheets in the shape of vehicle backlights are shown schematically, progressing through the apparatus in a single row. However, the invention is suitable for many other shapes of glass sheet which it is desired to bend and temper. It can, for example, be used to bend and toughen smaller sheets, to be used as vehicle doorglasses. In an apparatus according to the invention which is designed for such smaller sheets, the sheets may progress through the apparatus in multiple rows, e.g. two or even three sheets abreast. Certain parts of such an apparatus would be provided in a corresponding multiple number. For example, the press station would comprise two or even three presses (or at least two or even three pairs of press members) abreast, to press the multiple rows of sheets.

The apparatus may optionally be provided with an alignment apparatus for aligning the sheets accurately relative to the imaginary centreline 17 of the bending and tempering apparatus, in both rotational and translational senses. One suitable alignment apparatus 16 is shown in more detail in FIG. 2. It is desirable to align the sheets accurately so that each subsequent part of the bending and tempering apparatus can perform its function satisfactorily.

Figure 2:
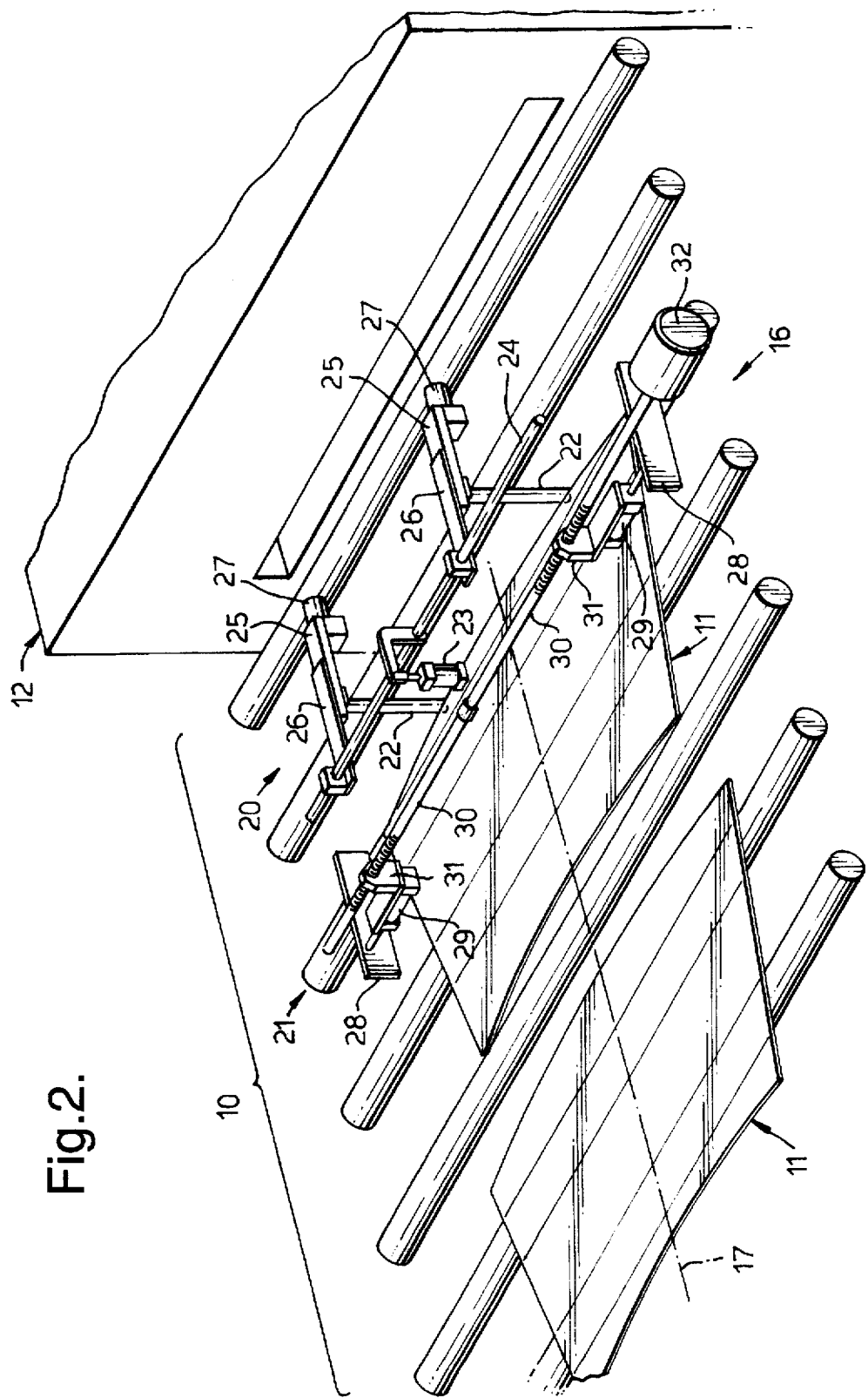
FIG. 2 is a perspective view of one possible apparatus for aligning glass sheets before entry into a furnace, which is part of the apparatus shown in FIG. 1.

Referring to FIG. 2, this shows one possible alignment apparatus 16, which is known from and more fully described in GB 2,193,709 corresponding to U.S. Pat. No. 4,895,244 (the disclosures of which are hereby incorporated herein by reference). It includes two parts, a positioning mechanism 20 for the front or leading edge of the glass sheet and a positioning mechanism 21 for the side edges of the sheet.

In FIG. 2, glass sheets 11 are being conveyed towards and into the entrance of the furnace 12, i.e. they are moving from left to right as depicted. The leading edge of a sheet 11 contacts spring-loaded retractable stop pins (not shown) which protrude from the lower ends of stop tubes 22 of positioning mechanism 20. The stop pins are made of a material, e.g. a nylon, which does not scratch glass. When the separation between the sheet 11 abutting the stop tubes 22 and the preceding sheet (i.e. the sheet which has already left the alignment apparatus) has reached a desired predetermined value, the stop tubes 22 are raised and the sheet proceeds. Raising of the stop tubes 22 is accomplished by the piston of air cylinder 23 retracting, and rotating shaft 24 in an anticlockwise sense as viewed from the end of the shaft 24 nearest to the viewer. Shaft 24 is splined so that the members by which each stop tube 22 is mounted rotate with the shaft, thereby swinging each stop tube 22 upwards. These members each comprise a slide 25 and slide mounting bracket 26 which provide for adjustment of the stop tube in the direction of the centreline 17. This adjustment is achieved by moving each slide mechanism 25 (and thereby stop tube 22) relative to bracket 26 by electric motor 27.

Side edge positioning mechanism 21 comprises side pusher brackets 28 operated by air cylinders 29 which are located below threaded shaft 30, and connected to it by threaded brackets 31. When a glass sheet 11 abuts the stop tubes, air cylinders 29 are activated and side pusher brackets 28 move towards the centreline 17 to accurately locate the sheet 11 relative to the centreline 17. The separation of the brackets 28 may be adjusted, e.g. for different size sheets, by operating electric stepping motor 32 which rotates threaded shaft 30 so that threaded brackets 31 move towards or away from each other.

Figure 3:
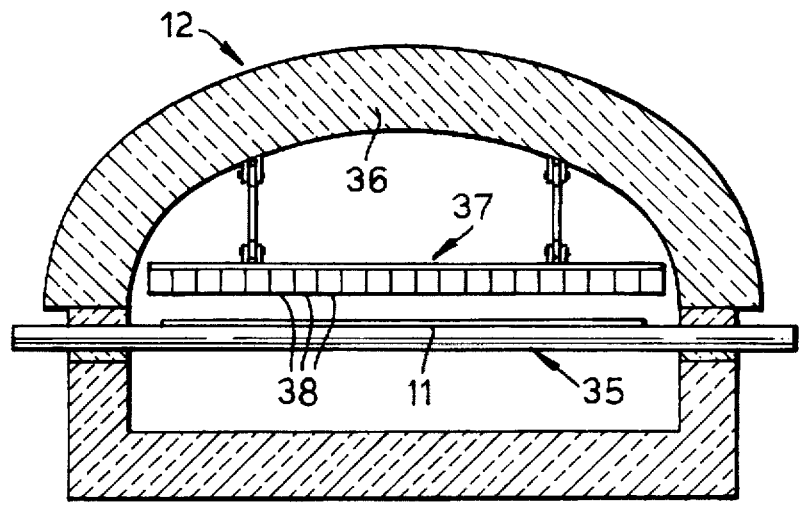
FIG. 3 is a cross-sectional view on the line III—III of part of the furnace of FIG. 1.

The accurately aligned glass sheets 11 pass into furnace 12 where they are heated to a temperature at which they are in a heat-softened condition and susceptible to deformation. The latter part of the furnace 12 is equipped with a differential heating apparatus to heat certain portions of the sheets 11 to a higher temperature than others. FIG. 3 shows a cross section of such a latter part of the furnace 12, through which a glass sheet 11 is conveyed on the second conveyor means 18 of FIG. 1, which comprises rollers 35. In the earlier uniform heating part of the furnace, heating elements would be provided on the inside of furnace roof 36, but in the latter differential heating part, they are replaced by differential heating assembly 37. Such an assembly is known from WO 90/14315 corresponding to U.S. Pat. No. 4,952,227 and WO 91/13037 corresponding to U.S. Pat. No. 4,983,202, the disclosures of which are hereby incorporated herein by reference. This assembly comprises a number of longitudinal heating elements 38 suspended in an array above the rollers 35 which convey the glass sheet 11. The heat output of each element 38, or at least of small groups of adjacent elements, is individually controlled so that more heat may be provided to some portions of the glass sheet than others. Normally, those portions of each sheet which are to be deeply or sharply bent are heated to a higher temperature so that they can be deformed more readily. On exiting the furnace 12 therefore, the temperatures of the various portions of each sheet constitute a series of temperature profiles which are optimised in both relative and absolute terms for the shape to which the sheet is to be bent.

Figure 4:
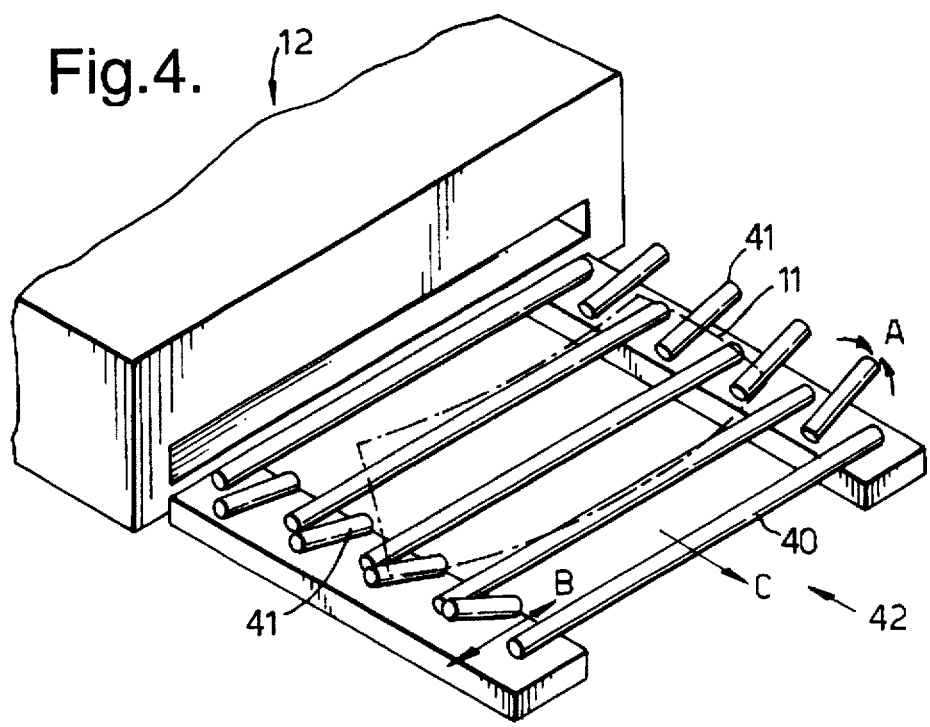
FIG. 4 is a schematic perspective view of a means of preliminarily bending the glass sheets, which may be incorporated in the apparatus of FIG. 1.

FIG. 4 shows a means of imparting a preliminary bend to a glass sheet. While not essential, such a means 42 is preferably incorporated in the bending and tempering apparatus because, by reducing the amount of shaping that is done at the press bending stage, high optical quality is more readily achieved on difficult shapes. The preliminary bending apparatus shown is known from EP 555 079, the disclosure of which is hereby incorporated herein by reference. It includes a support comprising a series of substantially horizontal conveyor rollers 40, and two series of laterally disposed, generally shorter rollers 41 which are inclined to rollers 40. Rollers 41 are disposed in pairs in alternating fashion with horizontal rollers 40, but other configurations are possible, and one or more of rollers 40 may themselves each be replaced by a number of mutually inclined rollers. Whatever configuration is used, the important point is that the various rollers together define a curvature profile which heat-softened glass sheet progressively adopts to provide a required pre-bend as it is conveyed from the furnace 12 to the press bending station 13. The angle of inclination of rollers 41 is adjustable and is set to progressively larger values for each pair of rollers successively further from furnace 12. Rollers 41 are also adjustable in the two other dimensions as indicated by arrows A and B on FIG. 4. When used, such preliminary bending means normally extends into press station 13 (although this is not shown on FIG. 4 for clarity), since the preliminary bent sheet 11 will require support until it is placed on the lower mould. The direction of movement of the sheet is indicated by arrow C. An alternative preliminary bending means comprises continuous contoured rollers, each roller comprising a curved core within a flexible sleeve, the sleeve being rotated about the core.

Figure 5:
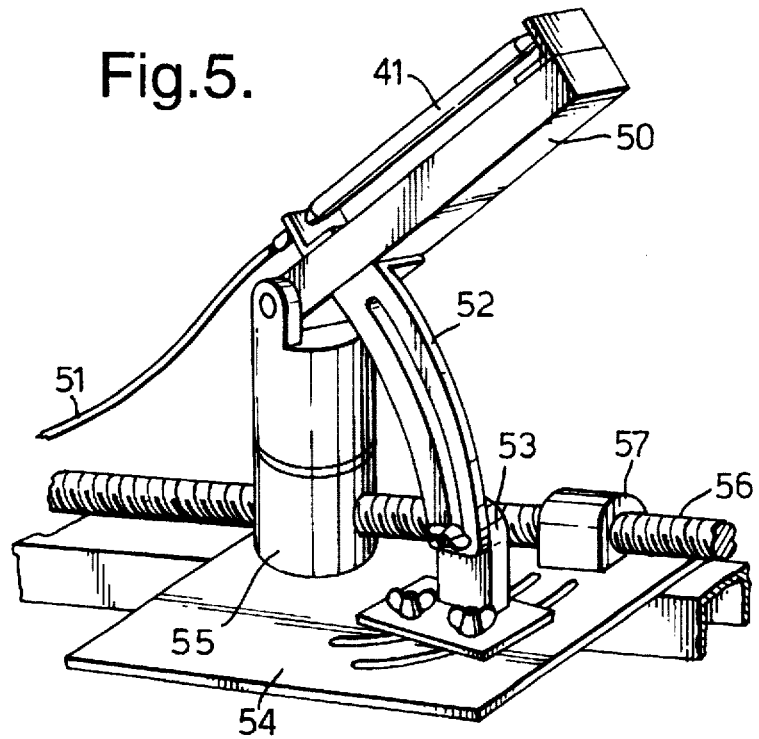
FIG. 5 is an enlarged perspective view showing additional details of a small part of the preliminary bending means of FIG. 4.

FIG. 5 shows a roller 41 together with the mechanism whereby directional adjustments may be achieved. Roller 41 is mounted on a supporting arm 50 and driven by means of a flexible driveshaft 51. Arm 50 is pivoted at its lower end and supported by arcuately slotted plate 52 which may be moved relative to bracket 53 and then clamped by a wing nut. Similarly, adjustment of the angular position of roller 41 in the horizontal plane as shown by arrow A in FIG. 4 is provided by movement of the base of bracket 53 along the arcuate slots provided in horizontal plate 54 in conjunction with a rotatable mounting within turret 55, thereby allowing angular movement of arm 50. Finally, lateral translational adjustment of roller 41 as shown by arrow B is provided by rotation of threaded shaft 56 which passes through the base of turret 55, and nut 57, both of which are attached to plate 54.

FIG. 6 shows press bending station 13, quench station 14, and unloading station 15, together with a fragment of furnace 12. The press 69 provided in press bending station 13 comprises a frame 60 with complementary upper and lower press members 61,62 mounted for opposed reciprocating movement within it, such a press 69 being known in general terms from a variety of documents including U.S. Pat. No. 5,279,635 the disclosure of which is hereby incorporated herein by reference. Press members 61,62 are mounted on upper and lower platens 63,64 which reciprocate in the vertical direction, guided by guiding members 67,68. An elevator means 108 for the lower mould 62 is provided in the form of actuating cylinder 66; similarly, an actuating cylinder 65 is provided for upper mould 61. The press 69 is provided with third conveyor means in the form of rollers 59 to convey the glass sheet 11 onto lower press member 62; but the majority of rollers 59 have been omitted from the press station 13 for clarity. The operation of transferring sheet 11 onto lower press member 62 is described below in conjunction with FIGS. 10, 11 and 12.

Figure 7:
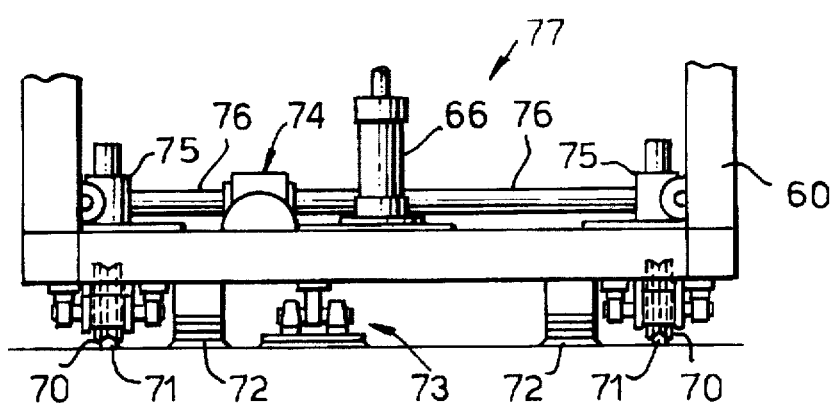
FIG. 7 is a side view of the lower part of a press, showing wheels and a centering and levelling system which may be added to the apparatus of FIG. 6.

As mentioned earlier, it is desirable to provide the press 69 with wheels and a means of centering and levelling so that it can be removed from the production line, the tooling changed, and replaced and aligned with the line with minimal delay. One such means 77 is illustrated in FIGS. 7 to 9, and is known from EP 424,478 corresponding to U.S. Pat. No. 4,872,898 the disclosure of which is hereby incorporated herein by reference. FIG. 7 shows the lower part of the press viewed from the side of the line, i.e. in the same direction as in FIG. 6, whereas FIGS. 8 and 9 show views taken along the longitudinal axis of the production line, at right angles to the direction of FIGS. 6 and 7. The press frame 60 is provided with grooved wheels 70 running on rails 71, enabling easy removal of the press. The working height of the press is determined by shimmed pedestals 72, and the press is secured in its working position by locking mechanism 73. The press is raised from its locked working position to its unlocked transport position by reversible drive unit 74 operating rotary jacks 75 via shafts 76 in a manner which will be explained in more detail with reference to FIGS. 8 and 9.

In FIG. 8, the lower part of the press is shown in the raised position for transport in or out of the production line. Wheels 70 are mounted on pivotable rocker arms 80. Operating bar 81 bears upon rocker arms 80 via rollers 82, and as shown in FIG. 8, the bar has been driven downwards, causing wheels 70 to act as fulcrums and press frame 60 to be raised. Operating bar 81 is actuated by rotary jacks 75, in turn actuated by drive unit 74 via shafts 76, and upon actuation of the drive unit 74 in the appropriate sense, jacks 75 allow operating bar 81 to rise to the position shown in FIG. 9, thereby causing the press frame to be lowered to its working height at which it rests upon pedestals 72. These have previously been adjusted to the correct working height by addition or removal of shims.

The press shown in FIGS. 8 and 9 is designed to be moved out of its working position in a right to left direction. When being moved back, a first approximate location is provided by spring-loaded bumper 83 contacting stop plate 84. Bumper 83 may also contain a proximity switch for control of the drive unit 74, thereby initiating lowering of the press. As the press is lowered, accurate final location is provided by the locking mechanism 73 which comprises a saddle 85 engaging a freely rotatable shaft 86. Saddle 85 defines a slot which is shaped so that, if the press is slightly out of alignment, lowering of the saddle 85 onto the shaft 86 urges the press into the correct position.

On entry into the press station, the heat-softened glass sheet (which may or may not have been preliminarily bent as described above) is transferred from rollers onto the lower mould. This is a critical point in the operation, because it is important both to locate the sheet accurately upon the lower mould to achieve the correct shape during bending, and to avoid the sheet being stationary upon the rollers for even the merest fraction of a second. The localised temperature changes caused by contact of a hot glass sheet with relatively cold rollers are such that the merest pause will cause optical distortion in the glass, if not actual marking of the surface. It is known to transfer the sheet to the mould by raising the mould relative to the rollers, thereby lifting the sheet from the rollers. This operation has to be very accurately timed in the sequence of bending operations to avoid introducing distortion. Furthermore, the mould elevator means has to work against both the force of gravity and the inertia of the relatively heavy lower mould and platen. During the development of the present invention, it was found instead that lowering the rollers relative to the lower mould was advantageous. This not only resulted in quicker transfer, but, since the rise of the lower mould to press the sheet is then independent of transfer of the sheet it also resulted in increased flexibility of operation. As a consequence, the timing of the rise of the lower mould is less critical with this arrangement.

Figure 10:
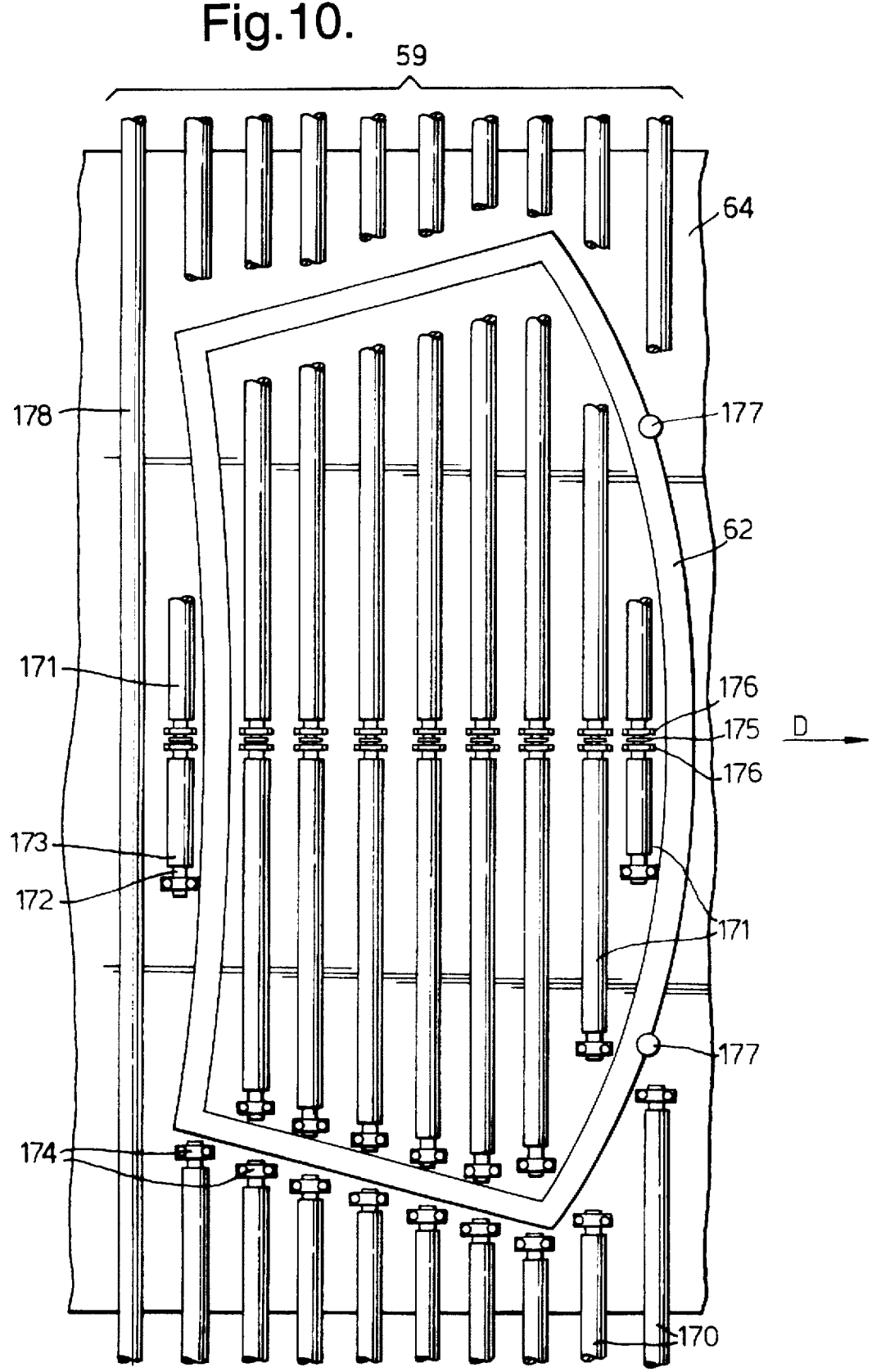
FIG. 10 is a plan view of part of a press, showing a lower mould and conveyor rollers for transferring a glass sheet onto the mould.

FIG. 10 shows a plan view of the lower mould 62 together with an arrangement of rollers 59 which may be used to transfer the sheet onto the mould. The principle of the arrangement is that in the region of the mould, short rollers 170,171 are used to support the heat-softened sheet, and these rollers do not pass over or under the mould so that they do not impede its rise, but are engineered to terminate as close as possible to mould 62 to optimise support for the sheet. This idea is known from WO 91/03432 corresponding to U.S. Pat. No. 5,004,492 the disclosure of which is hereby incorporated herein by reference. Rollers 59 (which include short rollers 170,171) may be curved in conformity with mould 62, in which case they comprise an inner flexible shaft 172 with an outer flexible sleeve 173 so that they may rotate in a curved configuration. A full width roller 178 is also shown.

Rollers 59 may in general be driven by conventional sprocket and chain means, arranged at the sides of the apparatus (i.e. the top and bottom of FIG. 10), but these are not shown in the drawing. However, those short rollers 171 which do not extend all the way to the sides, which will be referred to as auxiliary rollers, require separate drive means and bearings. Auxiliary rollers 171 and truncated stub rollers 170 are rotatably supported on bearings housed in brackets 174, as are shown in the lower half of FIG. 10. It is to be understood that the roller ends indicated in the upper half of FIG. 10 are similarly supported, although the brackets have not been drawn in for these roller ends.

Auxiliary rollers 171 are driven from below via sprockets 175 which are preferably centrally located on the roller. These sprockets may be driven by conventional engineering means such as chains or further sprockets (not shown) powered by a driveshaft (not shown) extending from one side of the apparatus under rollers 59. Auxiliary rollers 171 in fact comprise two roller segments which are united, driven and also rotatably supported at a convenient point such as the centreline of the apparatus. Support is by bearings within pedestals 176.

Heat-softened glass sheets are conveyed onto mould 62 in the direction of arrow D by rollers 59. Accurate location of the sheet on the rollers above mould 62 may be facilitated by the use of conventional retractable end-stops 177. As described above, the sheet is removed from rollers 59 as soon as it is in position above mould 62 by lowering rollers 59 and raising mould 62. At least the rollers within the circumference of mould 62 need to be lowered to transfer the sheet; additional rollers may be lowered for engineering convenience.

As soon as the sheet is in position above the mould 62, rollers 59 are lowered by a mechanism which is described below. If the timing of this operation is sufficiently accurate, it is possible to dispense with the endstops 177 of FIG. 10 altogether, as the sheet will lose contact with rollers 59 and hence stop advancing just as it arrives in the correct position. Simultaneously with, or slightly later than, the lowering of the rollers, actuating cylinder 66 (FIG. 6) is operated, causing lower platen 64 to rise together with lower mould 62, rollers 59, and their associated mechanism.

Figure 11:
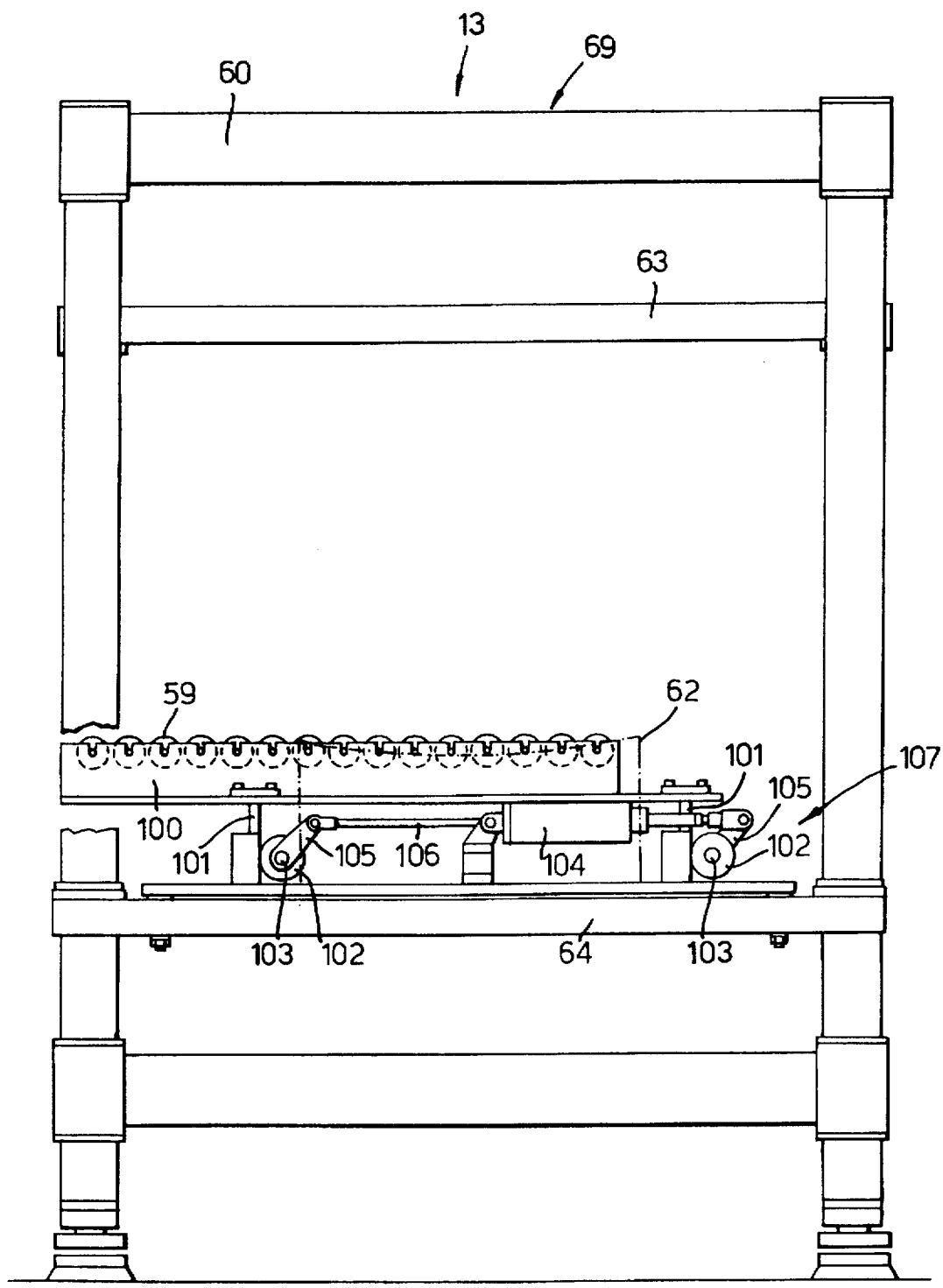
FIG. 11 is a side view of part of the press of FIG. 10 in which the conveyor rollers in the press bending station may be lowered.
Figure 12:
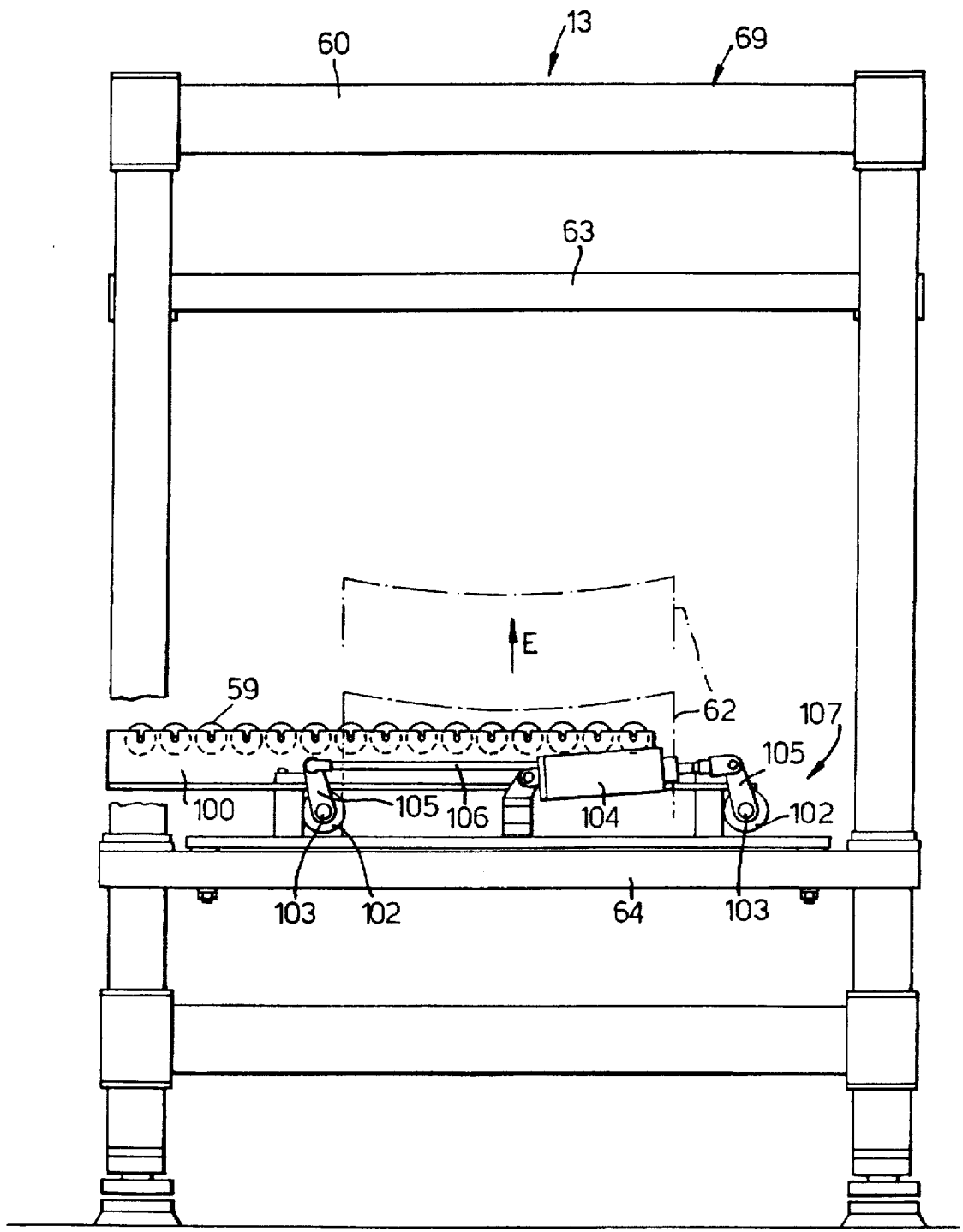
FIG. 12 is a side view of the press of FIGS. 10 and 11 showing the conveyor rolls in the lowered position.

FIGS. 11 and 12 show a lowering means for lowering rollers 59 relative to lower mould 62, mounted in press frame 60. Apart from the phantom outline of the upper part of lower mould 62, the press members and their associated actuating cylinders, and guiding members have all been omitted so as to reveal the roller-lowering means 107 better. Rollers 59 are mounted in a horizontal frame 100 which is itself supported by lower platen 64 so that frame 100 and rollers 59 may reciprocate in the vertical direction with platen 64. Platen 64 therefore constitutes a common support for the rollers 59 and the lower mould 62. Frame 100 is mounted on a plurality of toothed racks 101, which are in engagement with pinions 102 mounted on axles 103 for rotational movement. The piston of a cylinder 104 is connected to a crank 105, itself connected to other cranks 105 by connecting-rod 106. The cranks 105 are fixedly mounted on pinion axles 103, so that generally horizontal movement of the piston is converted to rotational movement of pinions 102, causing vertical movement of racks 101. In FIG. 11 the rollers 59 are in the raised position, in which they are level with furnace conveyor rollers 35 (not shown in FIG. 11), and slightly above the uppermost part of lower mould 62 so as to receive a glass sheet 11 arriving from the furnace 12 and convey it to a position directly above the lower mould, location of the sheet being assisted by retractable stop members (not shown in FIGS. 11 and 12) if desired. An instant before the sheet 11 is due to arrive in position directly above the lower mould 62, roller lowering cylinder 104 and lower mould actuating cylinder 66 (FIG. 6) are operated so that the rollers 59 are lowered and lower mould 62 is raised, transferring the sheet 11 from the rollers 59 the moment it has arrived in position.

FIG. 12 shows the lowering means 107 of FIG. 11 with the rollers 59 in the lowered position. The position of lower mould 62 is indicated twice, once for reference in a lower position corresponding to the position in which it is shown in FIG. 11 (thereby revealing the extent to which rollers 59 have been lowered), and again in a raised position which it adopts after movement in the direction of arrow E. Rollers 59 would of course also have been raised with mould 62.

The lowering means 107 may be supported on an independent frame member as an alternative to the lower platen 64. When a means of preliminary shaping of the glass sheet is employed, this may be similarly supported. It is desirable that a preliminary shaping means extends to a point immediately adjacent the lower mould, so that the shape of a pre-bent sheet is maintained by providing adequate support until the sheet is transferred onto the lower mould. In this situation rollers 59 may comprise horizontal rollers 40 and inclined rollers 41 as shown in FIG. 4. It is a matter of engineering convenience as to how many of the rollers 59 which are outside the circumference of the lower mould 62 are lowered together with the rollers within the circumference of the lower mould in order to transfer the sheet.

Once located on the lower mould, the glass sheet is shaped by pressing it against the upper mould whereby the sheet is shaped by pressing it between the complementary shaping surfaces of the moulds. This may be achieved by raising the lower mould further, or by lowering the upper mould, or by a combination of the two. The upper mould (and consequently its shaping surface) is internally heated to reduce heat loss from the glass sheet, and at least part of its shaping surface is provided with apertures at which the air pressure may be reduced, i.e. it is a vacuum mould. Examples of internally heated vacuum upper moulds are shown in FIGS. 13 to 17.

Figure 13:
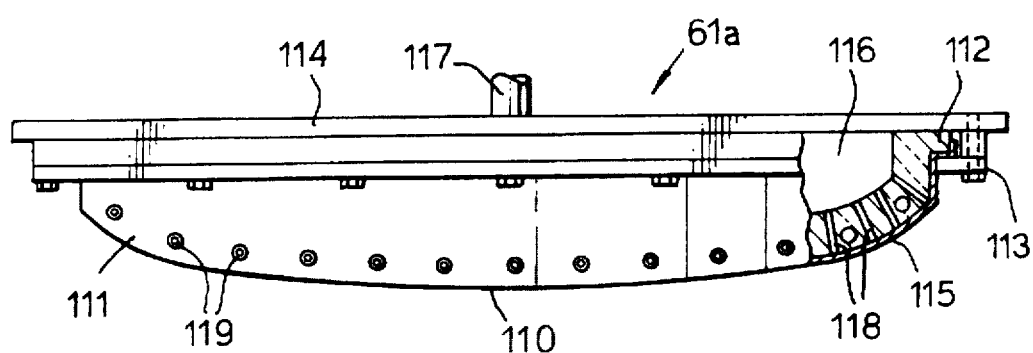
FIG. 13 is a side view, partially cut away, of an upper mould which may be used in the press bending units herein described.
Figure 14:
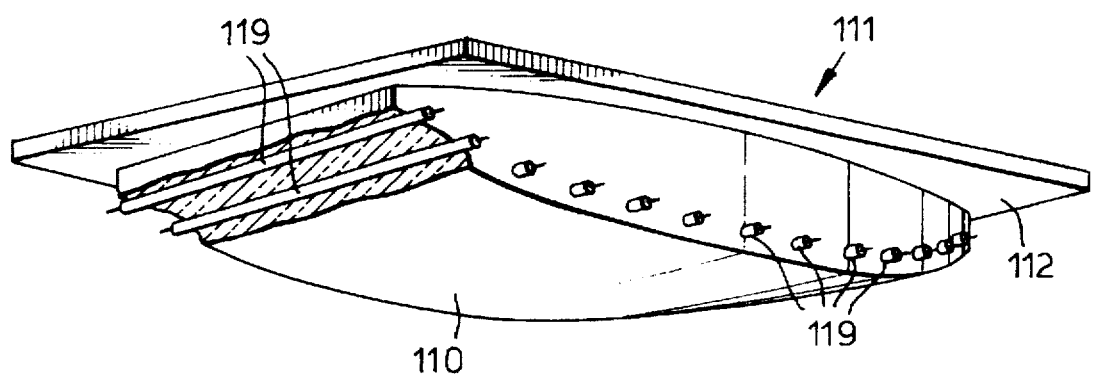
FIG. 14 is a perspective view, partially cut away, of part of the upper mould of FIG. 13.

FIGS. 13 and 14 show one possible design of vacuum upper mould 61a which is heated by means of electrical resistance heating elements and is known from WO 93/14038 which corresponds to U.S. Pat. No. 5,279,635. The mould 61a is of the solid and continuous type, having a continuous (and full face) shaping surface 110 which is complementary to that of the lower mould. Surface 110 is provided on a mould body 111 which is formed of any suitable material capable of withstanding the elevated temperatures to which it is subjected and may, for example, advantageously be a refractory material such as a ceramic material. An outwardly extending flange 112 integrally formed along, preferably, the entire perimeter of the mould body 111, cooperates with a plurality of L-shaped brackets 113 for mounting the shaping element to a support plate 114 suitably attached to the upper platen 63 (FIG. 6). To provide a resilient non-abrasive surface for contact with the heat softened glass sheet and to provide insulation, the shaping surface 110 is covered with one or two sheets 115 of durable heat-resistant cloth, such as woven or knit fibreglass or the like. Each insulating cloth sheet 115 is stretched tautly over the shaping surface 110 and held in place by suitable means.

A chamber 116 may be formed in the mould body 111, to serve as a manifold for a positive or negative air pressure to assist in the shaping and handling of the glass sheets. To that end, the shaping surface 110 is provided with a plurality of air passages 118 in communication with the chamber 116, and the mould body 111 is provided with a conduit 117 also in communication with the chamber 116 and a vacuum pump or a source of air under pressure. The air passages 118 may be, as shown, in the form of bores which may be drilled, or a porous or less dense refractory material, i.e. one containing small passages, can be chosen for the mould body. Such a material would permit a flow of air through the shaping surface without the need for the drilled passages. The bores or passages terminate at apertures in the shaping surface, which is thereby perforated, notwithstanding that it is a full face shaping surface.

A negative air pressure, or vacuum, can thus be provided at the shaping surface of the upper mould 61 to assist in retaining the sheet thereon, or conforming the sheet thereto. The vacuum can then be utilized to support the sheet as the lower mould 62 is lowered and a shuttle carrier ring (FIG. 19) is moved into position to transport the sheet out of the press station. When the carrier ring is in position under the upper mould, the latter descends to a position slightly above the ring. The air pressure at the apertures is suddenly increased to a level above atmosphere pressure, so that the bent sheet is positively released from the upper mould 61, and is placed accurately upon the carrier ring. This technique avoids the risk of marking the sheet as a result of it falling a significant distance, and alleviates problems of alteration of shape through inaccurate placement on the carrier ring.

The upper mould 61 is provided with a plurality of heating elements 119 extending through it, which are of an electrical resistance type suitable to be employed in the refractory mould body 111. The elements themselves are capable of reaching temperatures of the order of 600° C., producing temperatures up to 400° C. at the shaping surface. Surprisingly, however, it has been found that good optical quality and adequate tempering can be achieved with shaping surface temperatures as low as 200° C. The normal range of operating temperatures used at the shaping surface is 200° C.–350° C., a preferred range is 220° C.–300° C., and a temperature of 250° C. is most preferred.

Elements 119 may be embedded in the mould body 111 by casting it with the elements in place, or bores may be provided (e.g. by drilling) into which the elements are inserted. The elements 119 are connected in conventional manner to a suitable control unit (not shown) for regulating the power. The elements may be connected for individual control, or grouped in zones which are separately controlled. Thermocouples (not shown) are also provided within the mould body 111 near the shaping surface 110 to provide temperature readings at appropriate points to enable the temperatures across the shaping surface to be controlled. A further method of internally heating a vacuum mould is to pass hot air or gas through the vacuum system (i.e. conduit 117, chamber 116, and passages 118), so that the hot air or gas exits the apertures in the shaping surface, thereby heating it.

Figure 15:
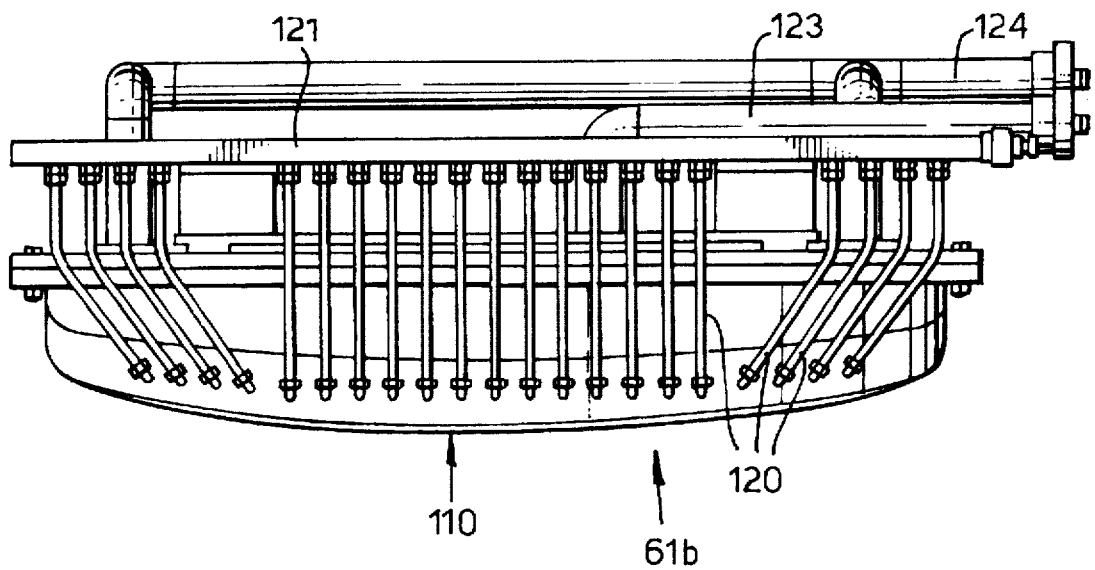
FIG. 15 is a side view of an alternative upper mould to that of FIGS. 13 and 14.
Figure 16:
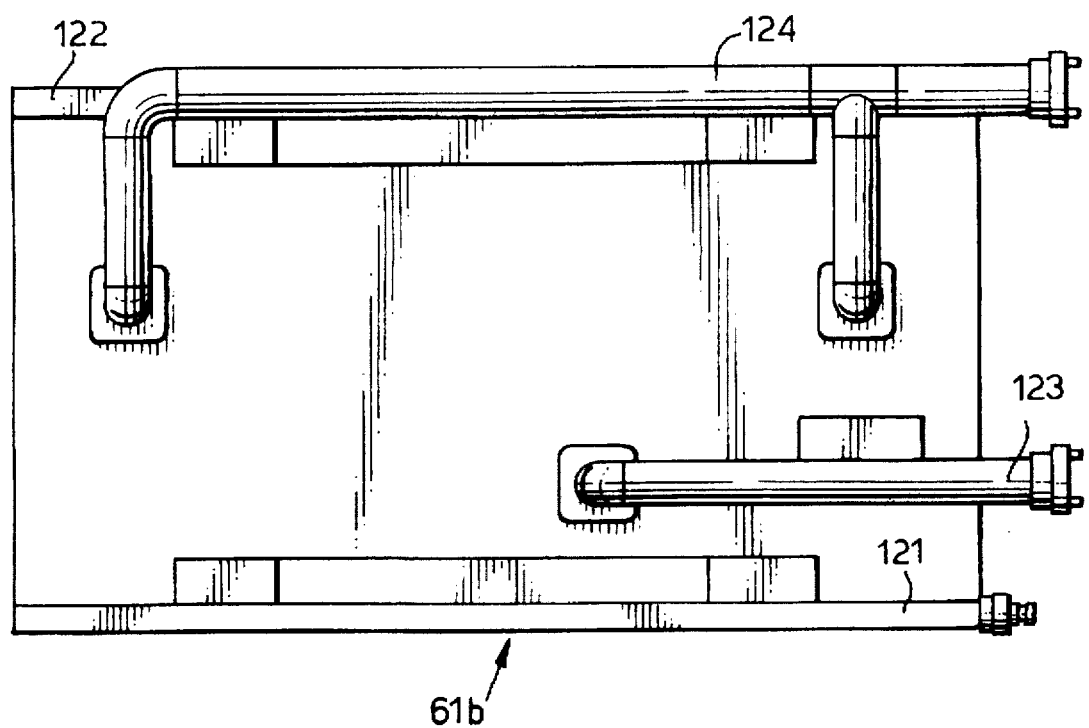
FIG. 16 is a plan view of the mould of FIG. 15.
Figure 17:
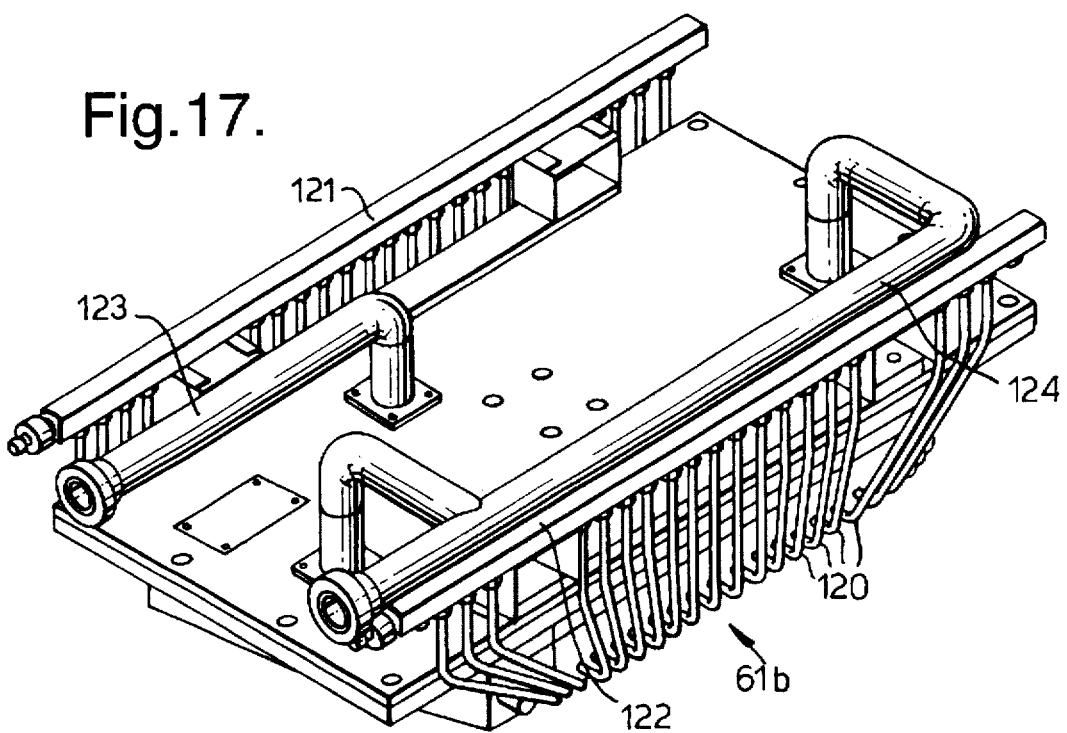
FIG. 17 is a perspective view of the mould of FIGS. 15 and 16.

FIGS. 15 to 17 show an alternative upper mould 61b. Like upper mould 61a, this is also a heated vacuum mould, but the heating is achieved in a novel fashion, by passage of a hot fluid through channels in the mould. The mould is cast from an aluminium alloy durable to high temperatures and includes bores which traverse the shorter dimension of the mould when seen in plan. The bores are connected to tubes 120, which may be of steel, or alternatively the tubes 120 pass right through the mould, being cast into the mould. On one side of the mould the tubes 120 are connected to an inlet manifold 121, and on the other side they are connected to an outlet manifold 122, and a hot fluid is circulated through the mould via the manifolds and tubes. Suitable fluids are mineral oils or synthetic oils which are of low volatility at 300° C. and have a specific heat capacity of 1.5 to 2.5 KJ/kg. Using such oils at 300° C., temperatures of 200° C. to 250° C. can be achieved at the shaping surface 110 with tubes 120 between 8 and 10 mm in internal diameter and a fluid velocity of about 1 dm$^3$/second. Alternatively, hot air or gas may be passed through the conduits. The shaping surface temperature may be controlled by controlling either the temperature or the rate of flow of the fluid.

As with upper mould 61a, mould 61b may be provided with an internal chamber connected to a source of negative or positive pressure, and in communication with apertures in the shaping surface. In fact the particular mould shown in FIGS. 15–17 is provided with three chambers comprising a central chamber and two end chambers arranged along the length of the mould. The central chamber is connected to vacuum/air conduit 123, and likewise the end chambers are connected to vacuum/air conduit 124. This multiple chamber arrangement makes it possible for example to provide differing degrees of suction in the end regions of the shaping surface compared with in the middle, which is advantageous for certain shapes. The arrangement is not limited to mould type 61b, but may also be provided in type 61a.

The important differences between the two types of upper mould are the means of heating and the materials used. Each type of material has advantages for different situations. Refractory mould 61a is more durable and the mould material does not in practice pose any constraints on operating temperature. However, the aluminium alloy of mould 61b has a thermal expansion such that it expands about the same amount, when heated from ambient to its working temperature of 200° C.–250° C., as a glass sheet expands when heated from ambient to its bending temperature of around 600° C. This means that the mould can be machined according to the shape of the bent sheet required at ambient temperature, without any compensation for thermal expansion. Because the material is machinable, changes to the mould may be made which call for removal of material, whereas a new refractory mould would normally have to be cast, unless a modern machinable ceramic had been used. While it is preferred that the ceramic mould is electrically heated, and the aluminium alloy mould is fluid-heated, it is of course possible to engineer different combinations of mould materials and heating techniques.

Figure 18:
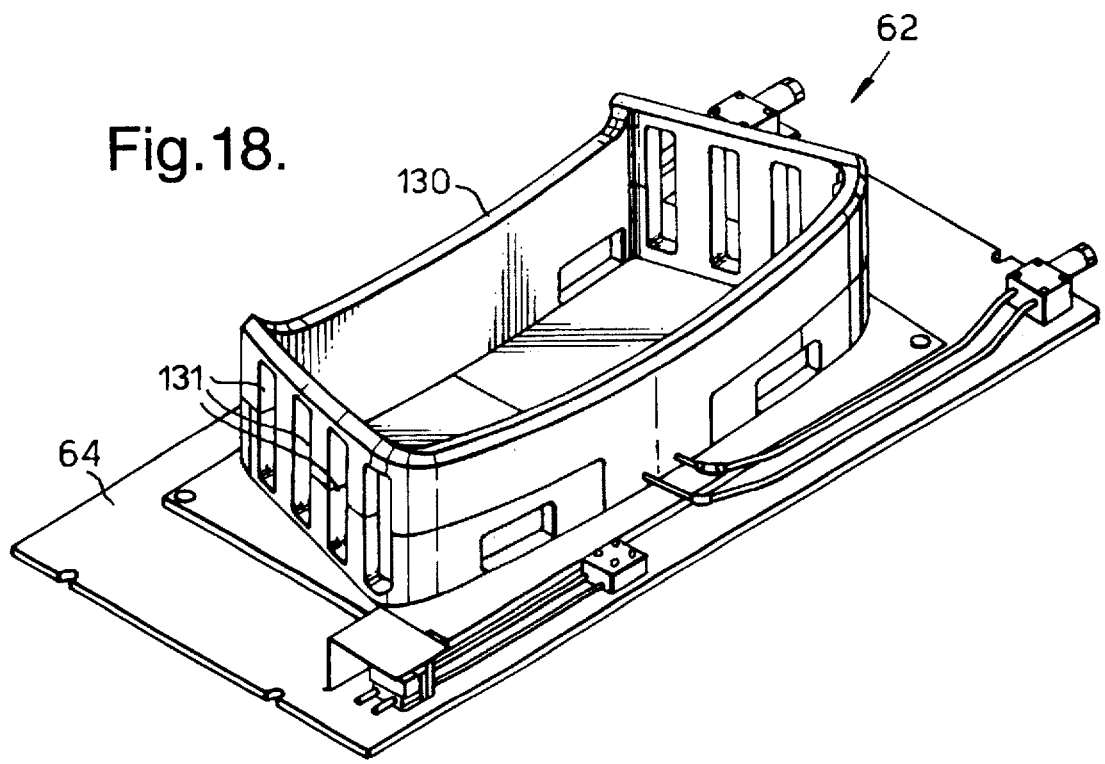
FIG. 18 is a perspective view of a lower mould which may be used in the presses herein described.

FIG. 18 shows the lower mould 62 which is of female or concave form, and comprises a shaping surface in the form of a continuous shaping rim 130 complementary in outline and elevation to the periphery of the full face shaping surface 110 of the upper mould 61. The end walls of the mould are provided with vertically extending slots 131 to accommodate the supports and driveshafts for the rollers 59 (not shown on FIG. 18) if the lower mould 62 is raised relative to the rollers as described above. Alternatively, lower mould 62 can take the form of a shaping rail supported on upright rods, between which the roller supports and drives can be accommodated.

Having thus been bent, and placed upon the carrier ring of a shuttle means, the glass sheet 11 is transported by the shuttle means into the quench station 14 (FIGS. 1,6), where it is tempered, and finally into unloading station 15. In addition to the press bending station 13 described earlier, FIG. 6 shows the quench and unloading stations 14,15, and the shuttle means 160, while FIG. 19 shows details of part of the shuttle means.

Referring to FIG. 19, the shuttle means comprises a carrier ring 140 which conforms in outline and elevation to the periphery of the bent glass sheet. Ring 140 is supported within a frame 141 which is itself supported on two cantilevered support arms 142 by means of locating pins 143 and V-shaped rests 144. Support arms 142 depend from shuttle glide rails 145 (FIG. 6) by means of glide plates 146, which are connected to the shuttle drive system via connectors 147. The drive system (FIG. 6) comprises drive unit 148, idler pulleys 149 and chain 150 (shown as a dashed line), which together enable the glide plates 146 and attached structure to travel back and forth along the glide rails 145.

Still referring to FIG. 6, quench station 14 comprises opposed upper and lower blastheads 151,152 disposed and operable to direct opposing streams of a cooling fluid such as air towards and against the opposite surfaces of the bent glass sheet 11 in known fashion. When the bent glass sheet enters the quench station, it is still sufficiently hot to undergo satisfactory tempering due to the effect of the heated tooling, yet it has not lost the shape accurately imparted to it in the press station 13 because it is supported by the carrier ring. During tempering, the drive unit 148 causes the carrier ring to reciprocate rapidly over a short distance, thereby causing an oscillating movement of the sheet in the quench, as is usually practised in the tempering art.

Having been tempered, the sheet 11 is transferred to the unloading station 15, which is known from WO 90/11973 corresponding to U.S. Pat. No. 4,883,526 (the disclosure of which is hereby incorporated herein by reference). The unloading apparatus comprises sheet lift mechanism 153 and a support mechanism comprising retractable pins 154. Sheet-engaging crossmembers 155 of the lift 153 are propelled upwards by drive unit 156 so as to lift sheet 11 from carrier ring 140 up to slightly above the level of pins 154. Pins 154 are extended into the region below the lower surface of sheet 11 so as to support it when cross-members 155 descend. The shuttle carrier ring can then be removed from unloading station 15, and return to the press station 13 for the next sheet. In the meantime, cross-members 155 rise again to collect the sheet from support pins 154 and lower it onto the take-off conveyor 157. During the unloading procedure, the sheet may be further cooled by air from opposed blastheads 158,159, so that on leaving the bending and tempering apparatus it is cool enough for subsequent operations.

What is claimed is:

1. A method of bending and tempering a glass sheet in a bending apparatus including a furnace for heating the sheet, a press bending station having upper and lower press members with opposed complementary shaping surfaces, the upper press member being a vacuum mould that is operable under reduced pressure, and a shuttle carrier ring, the glass sheet having several portions and a periphery, and the shuttle carrier ring conforming to the periphery of the sheet, wherein the method comprises the steps of:

heating a glass sheet that is up to 4.2 mm thick to a heat-softened condition in said furnace, including heating at least one portion of the sheet to a higher temperature than another portion, conveying the sheet out of the furnace and into said press bending station, shaping the sheet by pressing it between said opposed complementary shaping surfaces provided on said upper and lower press members, with at least one of the press members being internally heated to maintain the shaping surface of the at least one press member at a temperature within the range of 200° C. to 350° C. during shaping to thereby bend the glass sheet in two directions disposed at right angles to one another, transferring the bent glass sheet onto said shuttle carrier ring, by supporting the bent glass sheet on the shaping surface of the upper press member by way of reduced pressure within the upper press member, lowering the lower press member relative to the upper press member, moving the shuttle carrier ring and the upper press member relative to each other to bring the shuttle carrier ring into position below the upper press member, lowering the upper press member towards the shuttle carrier ring in a controlled fashion until the upper press member is close to and slightly above the shuttle carrier ring, and releasing the bent glass sheet from the upper press member so that the bent glass sheet is accurately placed upon the shuttle carrier ring, tempering the bent glass sheet, while supported on the carrier ring, by quenching the surfaces of the sheet, and removing the bent and tempered glass sheet from the carrier ring.

2. A method as claimed in claim 1, wherein said upper press member has apertures in the shaping surface thereof, and the bent sheet is suspended from said upper press member due to reduction of the air pressure at said apertures during transfer of the sheet onto the shuttle carrier ring.

3. A method as claimed in claim 2, wherein the bent glass sheet is released from the upper press member by suddenly increasing the air pressure at the apertures to a level above atmospheric pressure.

4. A method as claimed in claim 1, wherein said apparatus further includes an unloading station, and transfer of the bent sheet onto the shuttle carrier ring occurs in the press bending station, and the carrier ring conveys the sheet to the quench station, and from the quench station to said unloading station.

5. A method as claimed in claim 1, further comprising subjecting the sheet to a preliminary shaping step before pressing it.

6. A method as claimed in claim 5, further comprising conveying the sheet on a support shaped to impart a preliminary bend to the sheet.

7. A method as claimed in claim 1, wherein the vacuum mould comprises a plurality of vacuum chambers, the method including subjecting the glass sheet to differing degrees of suction in different regions of the shaping surface.

8. A method as claimed in claim 1, wherein the shaping surface of the internally heated press member is maintained at a temperature between 220° C. and 300° C.

9. A method as claimed in claim 1, wherein the shaping surface of the internally heated press member is maintained at a temperature around 250° C.

10. A method as claimed in claim 1, wherein the sheet is conveyed into the press bending station on conveyor rollers, and comprising transferring the sheet from the rollers onto said lower press member by lowering the rollers relative to the press member.

11. A method as claimed in claim 1, subjecting the sheet to an aligning step before pressing it.

12. A method of bending and tempering a glass sheet in a bending apparatus including a furnace for heating the sheet, a press bending station having upper and lower press members with opposed complementary shaping surfaces, the upper press member being a vacuum mould that is operable under reduced pressure, a shuttle carrier ring, and a quench station, the glass sheet having several portions and a periphery, and the shuttle carrier ring conforming in outline and elevation to the periphery of the sheet, wherein the method comprises the steps of:

heating a glass sheet that is up to 4.2 mm thick to a heat-softened condition in said furnace, including heating at least one portion of the sheet to a higher temperature than another portion, conveying the sheet out of the furnace and into said press bending station, shaping the sheet by pressing it between said opposed complementary shaping surfaces provided on said upper and lower press members, with at least one of the press members being internally heated to maintain the shaping surface of the at least one press member at a temperature within the range of 200° C. to 350° C. during shaping to thereby bend the glass sheet in two directions disposed at right angles to one another, transferring the bent glass sheet onto said shuttle carrier ring, by supporting the bent glass sheet on the shaping surface of the upper press member by way of reduced pressure within the upper press member, lowering the lower press member relative to the upper press member, moving the shuttle carrier ring and the upper press member relative to each other to bring the shuttle carrier ring into position below the upper press member, lowering the upper press member towards the shuttle carrier ring in a controlled fashion until the upper press member is close to and slightly above the shuttle carrier ring, and releasing the bent glass sheet from the upper press member so that the bent glass sheet is accurately placed upon the shuttle carrier ring, transferring the bent glass sheet into the quench station while maintaining the shape of the bent glass sheet by supporting the bent glass sheet on the shuttle carrier ring, tempering the bent glass sheet, while still supported on the carrier ring, by quenching the surfaces of the sheet, and removing the bent and tempered glass sheet from the carrier ring.

13. A method of bending and tempering a glass sheet in a bending apparatus including a furnace for heating the sheet, a press bending station having upper and lower press members with opposed complementary shaping surfaces, the upper press member being a vacuum mould that is operable under reduced pressure, a shuttle carrier ring, and a quench station, the glass sheet having several portions and a periphery, and the shuttle carrier ring conforming in outline and elevation to the periphery of the sheet, wherein the method comprises the steps of:

heating a glass sheet that is up to 4.2 mm thick to a heat-softened condition in said furnace, including heating at least one portion of the sheet to a higher temperature than another portion, subjecting the sheet to a preliminary bending step by conveying the sheet out of the furnace on a support shaped to impart a preliminary bend to the sheet and conveying the sheet into said press bending station, shaping the sheet by pressing it between said opposed complementary shaping surfaces provided on said upper and lower press members, with at least one of the press members being internally heated to maintain the shaping surface of the at least one press member at a temperature within the range of 200° C. to 350° C. during shaping to thereby bend the glass sheet in two directions disposed at right angles to one another, transferring the bent glass sheet onto said shuttle carrier ring, by supporting the bent glass sheet on the shaping surface of the upper press member by way of reduced pressure within the upper press member, lowering the lower press member relative to the upper press member, moving the shuttle carrier ring and the upper press member relative to each other to bring the shuttle carrier ring into position below the upper press member, lowering the upper press member towards the shuttle carrier ring in a controlled fashion until the upper press member is close to and slightly above the shuttle carrier ring, and releasing the bent glass sheet from the upper press member so that the bent glass sheet is accurately placed upon the shuttle carrier ring, transferring the bent glass sheet into the quench station while maintaining the shape of the bent glass sheet by supporting the bent glass sheet on the shuttle carrier ring, tempering the bent glass sheet, while still supported on the carrier ring, by quenching the surfaces of the sheet, and removing the bent and tempered glass sheet from the carrier ring.

14. A method as claimed in claim 13, wherein the support shaped to impart a preliminary bend to the sheet comprises a succession of mutually inclined straight rollers.

* * * * *